Figure 1:

(No Model.)

A. STRAUS.
PNEUMATIC TIRE.

No. 533,251. Patented Jan. 29, 1895.

Witnesses:
Raphaël Vetter
Ernest Hopkinson

Alexander Straus,
Inventor
by Duncan & Page.
Attorneys.

UNITED STATES PATENT OFFICE.

ALEXANDER STRAUS, OF NEW YORK, N. Y.

PNEUMATIC TIRE.

SPECIFICATION forming part of Letters Patent No. 533,251, dated January 29, 1895.

Application filed September 13, 1894. Serial No. 522,897. (No model.)

*To all whom it may concern:*

Be it known that I, ALEXANDER STRAUS, a citizen of the United States of America, residing in the city of New York, in the county and State of New York, have invented a new and useful Improvement Relating to Wheel-Tires for Bicycles and other Vehicles, of which the following is a specification, reference being had to the accompanying drawings.

The invention relates more particularly to the construction of the india-rubber sheath or protective cover of pneumatic tires in which a removable inner inflatable tube is used; but it is also applicable to the construction of what is known as the hose-pipe tire.

In carrying out the invention I take a straight strip of thin rubber, of the proper length for the sheath and of a width such that when folded over with its edges abutting it will form a tube of the required size. This strip is wound upon a "drum," and immediately over it I wind a similar strip of friction cloth cut on the bias, the two strips being of substantially the same width and length. The ends of the compound strip are to be overlapped and spliced. If the sheath to be made is designed for use with a removable inner tube, I now lay upon the exposed face of the compound strip a narrower strip of friction duck or some equivalent material, with soapstone or other material such as may be used to prevent the cohesion of meeting surfaces of india rubber applied to its under side to prevent it from adhering to the inner face of the sheath. I then fold the two edges of the compound strip over upon the friction duck until the edges accurately abut; after which I wrap the whole in the usual way and vulcanize. The abutting edges will thus be made to unite firmly and on the same plane, and the strip of friction duck will form a reinforcement of the seam whereby the needed strength is secured. The sheath on being removed from the drum is ready to be opened at the proper point for the insertion of the inflatable tube, such opening being provided with lacing or other means for closing it, in any known manner.

In making a hose-pipe tire (or one in which it is not designed to have the inner tube removable) the use of soapstone on the under side of the reinforcing strip is omitted. The inner tube, deflated and flattened, is laid directly upon the sheath strip before the edges of the latter are folded over; then these edges are folded over so as to abut, as before, the reinforcing strip of friction duck being introduced at the same time between the seam and the inner tube; after which the vulcanization takes place. The inner tube will then be found adherent to the inner walls of the sheath. The exterior of the seam, in the improved sheath above described, may, if desired, be finished up by laying over it before vulcanization a narrow strip of india rubber, or of friction cloth, which by the vulcanizing process will become incorporated in the structure. Such strip will not only add somewhat to the strength of the seam, but will serve also as a protection against injurious wear from the ends of the spokes or from particles of foreign matter that chance to lodge in the rim of the wheel.

Figure 2:
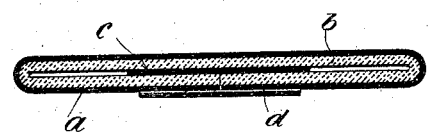
Figure 3:
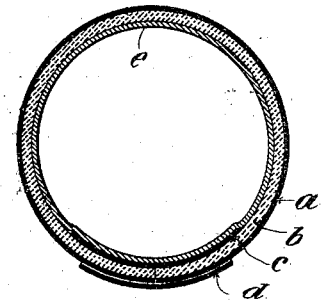

The above described construction is illustrated in the accompanying drawings, as follows:

Figure 1 shows a cross section of the strips of india rubber (*a*) and friction cloth (*b*) before their edges are folded over. Fig. 2 shows the same after being folded over, with the strip of friction duck (*c*) inserted under the seam and a strip of india rubber (*d*) applied to the exterior of the seam. Fig. 3 shows the sheath after vulcanization and when fully expanded by the introduction and inflation of the inner tube (*e*).

The above described method of making the sheath of a pneumatic wheel-tire is easy of application, and gives a structure which is smooth on its exterior and has all the required strength along the seam.

While it is greatly preferred to vulcanize the work on a drum, as above set forth, it is plain that it might be vulcanized as a straight tube, and afterward bent into the circular form of a wheel-tire and its ends united. One great advantage of the drum method is that in the process of vulcanization the material of the sheath takes on a permanent set in the circular form, without unequal strains, which would not be the case if the sheath were vulcanized straight and then curved around until its ends meet and are fastened. Moreover, when the ends are joined before vulcanization the union is more likely to be secure.

What is claimed as new is—

1. The hereinbefore described mode of making a tubular sheath for pneumatic tires, which consists in folding over the longitudinal edges of the constituent strip until they abut, at the same time introducing a piece of friction duck or some equivalent material into the tube beneath the seam, and then vulcanizing the whole in the flat, substantially as above set forth.

2. The above described sheath for pneumatic wheel-tires, consisting of a strip of india rubber and friction cloth, with its longitudinal edges folded over so as to abut, and having a reinforcing strip of friction duck or some equivalent material secured to the inner side of the seam, substantially as set forth.

ALEXANDER STRAUS.

Witnesses:
ROBT. F. GAYLORD,
ERNEST HOPKINSON.